United States Patent [19]

Iwayama et al.

[11] Patent Number: 4,572,779

[45] Date of Patent: Feb. 25, 1986

[54] PROCESS FOR THE DEWAXING OF HYDROCARBON FRACTIONS

[75] Inventors: Kazuyoshi Iwayama, Kamakura; Takehisa Inoue, Tokyo; Kimio Sato, Chiba; Norio Hayakawa, Ichihara; Masaki Fujii, Chiba, all of Japan

[73] Assignees: Toray Industries, Inc.; Fuji Oil Co., Ltd., both of Tokyo, Japan

[21] Appl. No.: 579,171

[22] Filed: Feb. 10, 1984

[30] Foreign Application Priority Data

Feb. 10, 1983 [JP] Japan .................................. 58-19629
Apr. 8, 1983 [JP] Japan .................................. 58-60682

[51] Int. Cl.$^4$ ............................................. C10G 45/64
[52] U.S. Cl. ........................................ 208/111; 502/77
[58] Field of Search ........................... 423/328, 329 T; 208/111, 120

[56] References Cited

U.S. PATENT DOCUMENTS

| Re. 28,398 | 4/1975 | Chen et al. | 208/111 |
|---|---|---|---|
| 4,296,083 | 10/1981 | Rollmann | 423/329 |
| 4,511,547 | 4/1985 | Iwayama et al. | 423/329 |

*Primary Examiner*—John Doll
*Assistant Examiner*—O. Chaudhuri
*Attorney, Agent, or Firm*—Birch, Stewart, Kolasch & Birch

[57] ABSTRACT

A process for improving the fluidity of hydrocarbon fractions by dewaxing thereof. In the present process, hydrocarbon fractions are contacted with hydrogen in the presence of a specific type of catalyst, thereby lowering the pour point of the hydrocarbon fraction. The catalyst comprises a specific type of zeolite which is defined by a specific X-ray diffraction pattern and which has a predetermined range of mesitylene adsorption of not less than 1.6 wt %.

21 Claims, 2 Drawing Figures

PROCESS FOR THE DEWAXING OF HYDROCARBON FRACTIONS

BACKGROUND AND SUMMARY OF THE INVENTION

Field of the Invention

The present invention relates to a process for improving the fluidity of hydrocarbon fractions and more particularly, to a process for the dewaxing of hydrocarbon fractions, typically fractions obtained from petroleum.

In recent years, kerosene, gas oil (an oil prescribed in JIS-Japanese Industrial Standard-K 2204) and A fuel oils (the first class fuel oil prescribed in JIS K 2205), which are called middle distillates, occupy an increasing proportion of the demand for petroleum with the definite tendency toward a lowering of the demand for B and C fuel oils (corresponding to the second and third class fuel oils prescribed in JIS K 2205). One of the useful methods of improving the yield of the middle distillate includes a dewaxing process in which the pour points of gas oil and A fuel oil are lowered. In general, if hydrocarbon fractions have a good or improved fluidity or pouring property at the time of storage, transportation or combustion, when used in various applications, there are obtained great benefits not only in increasing the yield of the middle distillates, but also in increasing the flexibility of the selection of crude oil in the refining of petroleum and permitting much easier handling of petroleum products in the winter.

Known dewaxing processes for improving fluidity of lubricant oils, which have been widely used, include solvent dewaxing processes typical of which is the MEK process, and the urea dewaxing process. However, these known dewaxing processes are all complicated and high in operating cost, with another disadvantage being that secondarily produced waxes (by-products) do not always have a sufficiently high added value. Accordingly, there is a demand for a new, effective dewaxing process or method.

In order to meet the demand, there has been proposed a process for lowering the pour point of hydrocarbon fractions in which zeolite catalysts are used to selectively convert and remove waxes from hydrocarbon fractions. The following three types of zeolite catalysts are known for such use.

(1) Zeolites capable of adsorbing n-paraffins but incapable of adsorbing hydrocarbons having a larger molecular diameter than iso-paraffins: See zeolite A (Canadian Pat. No. 877,293), and Elionite (U.S. Pat. No. 3,575,846).

(2) Zeolites capable of adsorbing n-paraffins and monomethyl-substituted paraffins but incapable of adsorbing hydrocarbons containing a quaternary carbon atom such as 2,2-dimethylbutane: See zeolite ZSM-5 (U.S. Pat. No. 3,700,585 and U.S. Pat. No. Re. 28,398).

(3) Zeolites capable of adsorbing hydrocarbons containing a quaternary carbon atom such as neopentane and having a pore size smaller than zeolite Y: See Mordenite (U.S. Pat. No. 3,516,925).

Because n-paraffins, which are one of the main components of wax, have a molecular diameter of about 5 Angstroms, these prior art techniques make use of zeolites having a relatively small pore diameter in order to increase the selectivity of the decomposition reaction of n-paraffins. With regard to the abovementioned three types of zeolites, it is considered suitable to have pores capable of adsorbing monomethyl-substituted paraffin.

Various attempts have been made to improve catalysts based on ZSM-5 zeolite. As a result, there has been proposed the use of ZSM-23, 35 having a pore size between those of (1) and (2) (See U.S. Pat. No. 4,222,855).

However, these prior art techniques have a number of drawbacks. The catalysts used are very expensive; the catalytic activities thereof are unsatisfactory, so that undesirable high reaction temperatures are required or the catalyst life is relatively short; and recovery of the dewaxed oil is low. Accordingly, a catalyst is desired which has high catalytic activity, high selectivity and long life. As a result of intensive studies on the dewaxing of hydrocarbon fractions it has been unexpectedly found that, contrary to the teachings of U.S. Pat. No. 3,700,585, pentasil-type zeolites which have a relatively large pore size, sufficient to adsorb hydrocarbons containing a quaternary carbon atom such as 2,2-dimethylbutane, are excellent as a catalyst with high activity.

An object of the present invention is to provide a process for dewaxing of hydrocarbon fractions in an atmosphere of hydrogen and in the presence of a specific type of zeolite catalyst.

Another object of the present invention is to provide a process for dewaxing hydrocarbon fractions whereby dewaxed oil is obtained in a high yield.

A further object of the present invention is to provide a process for dewaxing hydrocarbon fractions in the presence of a zeolite catalyst of high activity whereby reaction temperatures can be maintained at a level lower than those of prior art techniques.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Pursuant to the present invention, the above objects can be achieved by using a zeolite catalyst having an X-ray diffraction pattern as shown in Table 1 and the capacity of adsorbing mesitylene (1,3,5-trimethylbenzene) in an amount not less than 1.6 wt%.

Use of the specific type of zeolite catalyst which exhibits such a specific adsorption amount of mesitylene as defined above improves the diffusion of the reactant to active sites and the desorption of the resulting reaction product from the sites. Thus, the reaction activity increases with a reduction of the secondary, side reactions of the product.

The catalyst used in the practice of the present invention yields a high recovery of dewaxed oil and exhibits high activity as will be particularly shown in the examples appearing hereinbelow. When known catalysts are used, large amounts of (1) LPG and (2) naphtha or gasoline are secondarily produced as byproducts by the dewaxing reaction. The value of these materials varies greatly, depending on the balance of supply and demand of petroleum and other factors. Accordingly, the high level of recovery of dewaxed oil contributes to increasing the economical stability of the dewaxing process. This is very advantageous from an industrial standpoint. The catalyst has such a high activity that reaction temperatures can be set at a lower level than in the case of known catalysts. Accordingly, a long-run operation becomes possible while suppressing thermal deterioration of hydrocarbon oils. The dewaxed oil thus obtained possesses good color and good stability.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
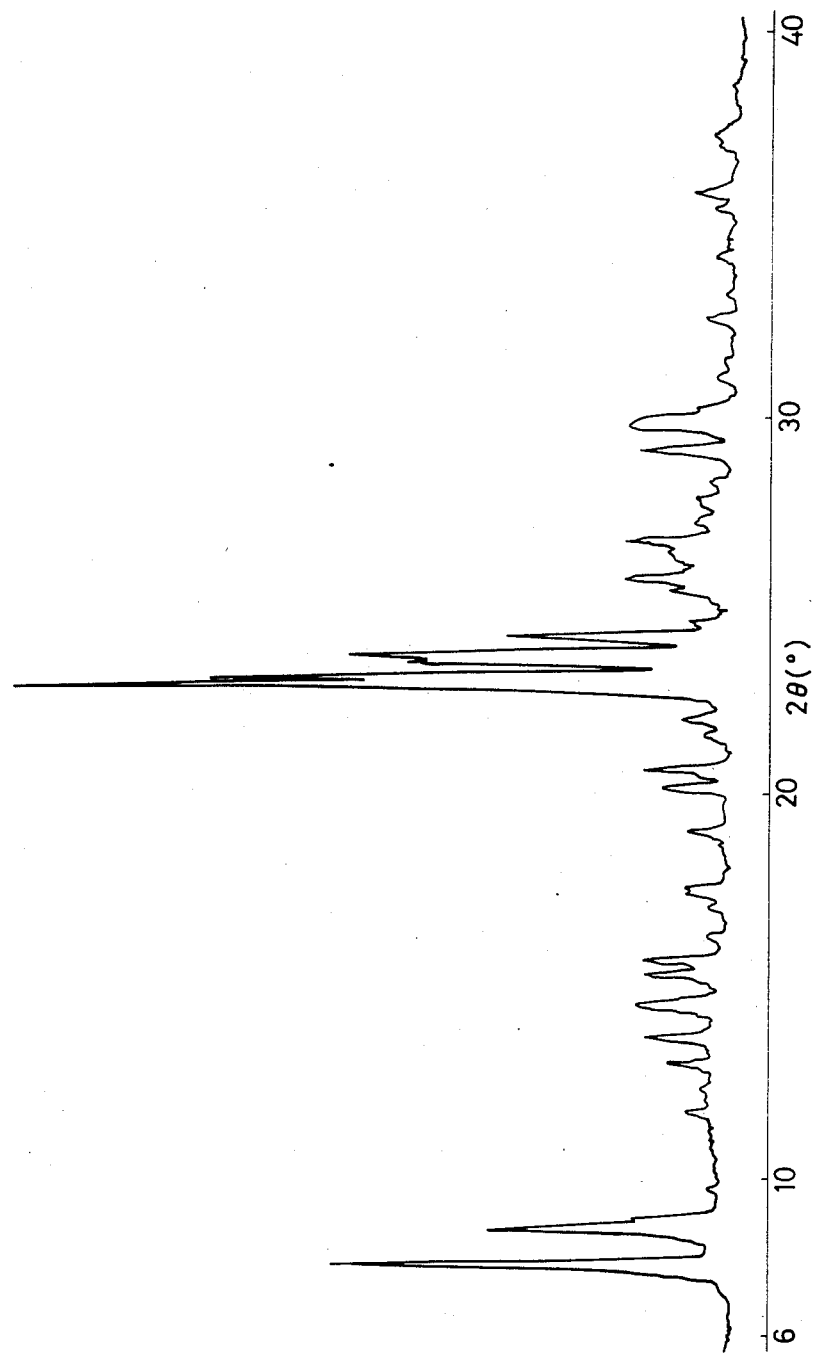
FIG. 1 is an X-ray diffraction pattern of the zeolite catalyst used in Example 1.

Feedstocks used in the present invention include various hydrocarbon fractions containing wax which are obtained, for example, from crude oil, sand oil, and coal. Virgin or desulfurized gas oil, and vacuum gas oil fractions from distillation plants or thermal-cracking plants are suitable for producing fuel oils having improved fluidity. Vacuum distillates having boiling points ranging from about 300° C. to 550° C., which are called light, medium and heavy neutral stocks, and solvent deasphalted vacuum residues named bright stock are suitable for producing lubricating oil bases. If necessary, these distillates may be refined by solvent extraction, for example, using the furfural or phenol method, in order to improve viscosity index, stability and color.

In the reaction of the present invention, an acid type zeolite is used as the catalyst. It is also preferred that the water content, the nitrogen-containing compounds, and the residual carbon of the feedstocks are small. These impurities should preferably be reduced so that the moisture content is below 1000 ppm, the nitrogen content is below 1000 ppm, and the residual carbon content is below 1.0 wt%. Most preferably, the moisture content is below 500 ppm, the nitrogen content is below 500 ppm, and the content of carbon residue is below 0.5 wt%.

The zeolite used in the present invention should have, in its alkaline form, an X-ray diffraction pattern as shown in Table 1, more preferably an X-ray pattern as shown in Table 2. The diffraction pattern is obtained by X-ray irradiation from the K-α ray of copper using a Geiger counter spectrometer. From the diffraction pattern, a relative intensity $100I/I_{MAX}$ in which $I_{MAX}$ represents the strongest line and d spacing (dÅ) are determined.

TABLE 1

| X-ray Diffraction Pattern | |
|---|---|
| d (A) | 100 $I/I_{MAX}$ |
| 11.2 ± 0.2 | S |
| 10.1 ± 0.2 | S |
| 3.86 ± 0.08 | VS |
| 3.72 ± 0.08 | S |
| 3.66 ± 0.05 | M |

TABLE 2

| X-ray diffraction Pattern | |
|---|---|
| d (A) | 100 $I/I_{MAX}$ |
| 11.2 ± 0.2 | S |
| 10.1 ± 0.2 | S |
| 9.8 ± 0.2 | M |

TABLE 2-continued

| X-ray diffraction Pattern | |
|---|---|
| d (A) | 100 $I/I_{MAX}$ |
| 6.37 ± 0.1 | W |
| 6.00 ± 0.1 | W |
| 5.71 ± 0.1 | W |
| 5.58 ± 0.1 | W |
| 4.37 ± 0.08 | W |
| 4.27 ± 0.08 | W |
| 3.86 ± 0.08 | VS |
| 3.82 ± 0.08 | VS |
| 3.75 ± 0.08 | S |
| 3.72 ± 0.08 | S |
| 3.66 ± 0.05 | M |
| 3.00 ± 0.05 | M |
| 2.00 ± 0.05 | W |

In the above tables, the relative intensity, $100I/I_{MAX}$ is evaluated as follows: VS=very strong; S=strong; M=medium; and W=weak.

The zeolite used in the present invention is represented by the following formula:

$$(1.0\pm0.2)M_{2/n}O.Al_2O_3.XSiO_2.YH_2O$$

in which M represents a cation (preferably hydrogen or a precursor thereof), n is a valence of M, X is a value ranging from 15 to 60, preferably from 20 to 35, and Y is a value ranging from 0 to 25.

The zeolite of the present invention in its acidic form should adsorb mesitylene in an amount not less than 1.6 wt%, preferably not less than 1.8 wt%, under the following conditions.

The adsorption of mesitylene is determined according to the method prescribed in JIS K-1412. The zeolite obtained is fully subjected to a dealkalization treatment using an aqueous ammonium chloride solution. Subsequently, the sample is shaped, without the use of a binder, to a size of 20–32 mesh and calcined at 550° C. for 16 hours in air. The resulting zeolite is subjected to the adsorption test using the following conditions:

| | |
|---|---|
| Amount of adsorbent | about 4 g |
| Adsorption temperature | 25° C. |
| Carrier gas | $N_2$, 800 N-ml/min |
| Partial pressure of mesitylene | 0.5 mmHg |
| Adsorption time | 6 hours |

Preparation of the zeolite used in the present invention is not limited to any specific methods so long as the resulting zeolite has the characteristics as indicated hereinbefore.

A typical process for preparing the zeolite is described below. An aqueous reaction mixture comprising silica, alumina and alkali sources, and an organic compound containing carboxyl groups (which are, respectively, represented by $SiO_2$, $Al_2O_3$, $OH^-$, and A) in the following molar ratios is provided and subjected to reaction until crystals are formed, thereby obtaining the zeolite.

| | |
|---|---|
| $SiO_2/Al_2O_3$ | 20–60 |
| $H_2O/SiO_2$ | 5–100 |
| $OH^-/SiO_2$ | 0.1–0.35 |
| $A/Al_2O_3$ | 0–100 |

Examples of the silica source include silica sol, silica gel, silica aerogel, silica hydrogel, silicic acid, silicates, sodium silicate, and the like.

Examples of the alumina source include sodium aluminate, aluminum sulfate, aluminum nitrate, alumina sol, alumina gel, active alumina, gamma-alumina, alpha-alumina, and the like.

Examples of the alkali source include caustic soda, caustic potash, and the like, of which caustic soda is preferred. These alkali sources are added to the reaction system so that $OH^-$ is preferably present in the reaction mixture.

The organic compounds containing carboxyl groups include, for example, aromatic, aliphatic and alicyclic carboxylic acids. The organic compounds may contain, aside from carboxyl groups, other functional groups such as, for example, hydroxyl or amino groups. Typical examples of the organic compound include succinic acid, tartaric acid, citric acid, toluic acid, salicylic acid and the like. These organic acids are converted to alkali metal salts thereof in the reaction system. In this sense, they may be used as an alkali metal salt.

The resulting aqueous reaction mixture is converted to as uniform a slurry as possible and is placed for crystallization in a closed container such as, for example, an iron, stainless steel or fluorocarbon resin-lined autoclave. The reaction conditions for the crystallization include a reaction temperature of about 80°–250° C., preferably about 100°–200° C., more preferably 140°–200° C., and a reaction time of from about 5 hours to 30 days, preferably from about 10 hours to 10 days. It is convenient that during the course of the crystallization, the reaction mixture is continuously or periodically agitated so as to be maintained as uniform as possible. After cooling, the crystallized reaction product is withdrawn from the closed container, followed by washing with water, filtering and, if necessary, drying. The resulting crystalline aluminosilicate has an X-ray diffraction pattern as shown in Table 2.

The adsorption of mesitylene can be controlled to be not less than 1.6 wt% by the suitable selection of the ratio of the starting silica and alumina and the type of organic compound.

The crystalline aluminosilicate thus obtained is the alkaline type and does not have adequate solid acidity. In the practice of the present invention, the crystalline aluminosilicate should be converted to the acid type. As is well known in the art, the acid-type crystalline aluminosilicate has, as cations therein, a hydrogen ion, an ammonium ion, or divalent or polyvalent cations such as rare earth element ions. This is attained by exchanging at least a part, e.g. 50% or more, of the monovalent alkali metal ions, such as the sodium ions of crystalline aluminosilicate by hydrogen ions, ammonium cations or polyvalent cations. This ion exchange is preferably effected as follows: crystalline aluminosilicate is treated with a solution containing an acid and/or an ammonium salt compound in order to introduce hydrogen ions and/or hydrogen ion precursors into the crystalline aluminosilicate. The ion exchange treatment is ordinarily conducted by the use of an aqueous solution. The acids useful for the above purpose are inorganic or organic acids. Inorganic acids are usually used. Examples of the inorganic acid include hydrochloric acid, nitric acid, phosphoric acid, carbonic acid, and the like. As a matter of course, any other acids containing hydrogen ions may be used. Use of an inorganic acid as a solution of high concentration is undesirable because crystalline aluminosilicate may change in structure thereof. The advantageous concentration of acid varies greatly depending on the type of acid and thus cannot be determined conditionally. Care should be taken in the use of the acid so that no great change takes place in the structure of the aluminosilicate.

The ammonium salt compounds include, for example, inorganic ammonium salts such as ammonium nitrate, ammonium chloride, ammonium sulfate, ammonium carbonate, liquid ammonia and the like, and ammonium salts of organic acids, such as ammonium formate, ammonium acetate, ammonium citrate and the like. Preferably, inorganic ammonium salts are used. The ammonium salt is preferably used as a 0.05 to 2N solution, and most preferably as an about 0.1 to 2N solution. The ion exchange treatment of crystalline aluminosilicate with an acid and/or an ammonium salt solution is effected either in a batch-wise method or continuous method. If the batch method is used, the liquid-to-solid ratio should be determined such that crystalline aluminosilicate adequately contacts with the solution. In particular, the solution is used in an amount not less than about 1 liter/kg. The treating time is in the range of from about 0.1 to 72 hours, preferably about 0.5 to 24 hours. The treating temperature may be below the boiling point of the system. The reaction is preferably effected under heating conditions in order to increase the ion exchange speed. Where the treatment is effected in a continuous method, a fixed bed or a fluidized bed system is utilized. In this case, care should be taken in order to avoid the occurrence of non-uniform flow in the system or to cause the ion exchange treatment to proceed in a non-homogeneous manner. The crystalline aluminosilicate obtained by the ion exchange treatment is subsequently washed with water. For this purpose, distilled water is conveniently used and the washing is effected in a batch-wise method or continuous method. In this manner, hydrogen ions and/or ammonium ions, which are a hydrogen ion precursor, are introduced into the crystalline aluminosilicate, thereby imparting solid acidity thereto. The crystalline aluminosilicate may contain cations other than hydrogen ions and/or a precursor thereof. Such cations are not limited with respect to the species and the amount.

An apparatus used in the reaction of the invention may be either a fixed bed or a fluidized bed. Preferably, a fixed bed system is used because of its simple construction and ease in operation. With the fixed bed system, a smaller size of catalyst is preferable from the standpoint of an effective coefficient of catalyst. However, too small a size is undesirable because it increases the pressure drop. Accordingly, the size of catalyst particles should be within a certain range. The size is generally in the range of from 0.05 to 10 mm, preferably 0.3 to 3 mm. The prepared crystalline aluminosilicate is ordinarily in the form of a powder. Accordingly, use of the aluminosilicate as a catalyst having the above-defined range of particle size needs proper agglomeration or shaping. The production of a shaped catalyst may be performed by conventional methods, for instance tabletting, extruding, pelletizing or the like. In the case where an extrusion method is used, it is convenient to use a binder in order to improve the productivity of the shaped bodies or impart mechanical strength thereto. Needless to say, if the aluminosilicate can be shaped without use of any binder, no binder is necessary. Examples of the binder include natural clays such as kaolin, bentonite, montmorillonite and the like, and synthetic products such as silica sol, alumina sol, alumina gel and the like. The amount of the binder is generally present in a range of less than 70 wt%, preferably less than 30 wt%. The shaping may be effected prior to or after the ion exchange treatment of crystalline aluminosilicate. The catalyst used in accordance with the present invention may be admixed with a component useful for hydrogenation such as palladium, platinum, rhenium, ruthenium, nickel, molybdenum, tungsten, vanadium and the like in order to improve activity, selectivity, life and the like. These hydrogenation components may be added to the aluminosilicate catalyst by kneading, impregnation, physical mixing or like techniques. Although the manner of the addition is not limited to the technique mentioned above, it is favorable from the viewpoint of activity and selectivity to uniformly disperse the hydrogenation component throughout the aluminosilicate particles. In this sense, a kneading or impregnation technique is preferred because of good dispersion of a hydrogenation component over the aluminosilicate catalyst. The amount of palladium, platinum, rhenium or ruthenium which is present is in the range of 0.01 to 3 wt%, preferably 0.05 to 0.5 wt%, as an element. With nickel, molybdenum, tungsten or vanadium, the amount utilized is in the range of about 0.1 to 10 wt%, preferably about 0.2 to 5 wt%.

The catalyst of the present invention which has been prepared as described hereinbefore is dried and calcined prior to use. The catalyst is dried at a temperature of from about 50° to 250° C. for over 0.1 hour, preferably about 0.5 to 48 hours. The dried catalyst is subsequently calcined at a temperature of from 300° to 700° C., preferably 400° to 600° C., for over 0.1 hours, preferably 0.5 to 24 hours. The calcination is carried out in air, in an inert gas or in an atmosphere of air or an inert gas and water vapor. As a result of the calcination, the ammonium ions introduced by the ion exchange treatment are converted into hydrogen ions. When the calcination temperature is increased, the aluminosilicate is converted to a decationized type. The decationized aluminosilicate may also be used in the practice of the present invention.

The thus prepared catalyst is used under the following reaction conditions. The reaction temperature is in the range of from about 200° to 500° C., preferably from about 250° to 450° C. The reaction pressure is in the range of from atmospheric to about 100 kg/cm²G, preferably from about 10 kg/cm²G to 70 kg/cm²G. The liquid hourly space velocity (LHSV) which means the contact time for the reaction is in the range of from about 0.1 to 10 hr$^{-1}$, preferably about 0.5 to 4 hr$^{-1}$. The ratio of hydrogen to hydrocarbon ranges from 100 to 1000N-m³/m³, preferably 200 to 800 N-m³/m³.

The present invention will now be described with reference to the examples, in which the catalytic performance is evaluated under the following reaction conditions.

Reaction conditions

| LHSV (hr$^{-1}$) | 2.0 |
|---|---|
| Reaction pressure (kg/cm² G) | 35 |
| H$_2$/Feed (N-ml/ml) | 500 |

The reaction temperature is changed according to the catalytic activity so that the pour point of 165° C.+ or 270° C.+ fraction of the reaction product is maintained, at a predetermined level.

EXAMPLE 1

9.22 g of solid caustic soda and 12.5 g of tartaric acid are dissolved in 344.2 g of water. To this solution is added 17.5 g of a sodium aluminate solution to give a homogeneous solution. 66.0 g of silicic acid are gradually added to the solution with agitation, to obtain an aqueous reaction mixture as a uniform slurry. The reaction mixture has the following composition (by mole).

| SiO$_2$/Al$_2$O$_3$ | 30 |
|---|---|
| H$_2$O/SiO$_2$ | 20 |
| OH$^-$/SiO$_2$ | 0.17 |
| A/Al$_2$O$_3$ | 2.5 |

The mixture is placed in a 500 ml autoclave and closed tightly. Thereafter, the content is heated at 160° C. with agitation, followed by crystallization over 72 hours. After completion of the crystallization, the resulting product is taken out from the autoclave, followed by washing with distilled water until the pH becomes approximately neutral, and filtered and dried at 110° overnight. The resulting product is a zeolite having an X-ray diffraction pattern as shown in FIG. 1 and an adsorption of mesitylene of 2.1 wt%. The thus obtained zeolite powder is subjected to an ion exchange treatment in a batch-wise manner for 30 minutes by heating it in an aqueous 0.187N ammonium chloride solution in a liquid-to-solid ratio of 5 (l/kg) at a temperature of 80° to 90° C. This treatment is repeated 5 times. Subsequently, the treated powder is washed with water and dried overnight at 110° C. The thus dealkalized zeolite powder is admixed with alumina sol as a binder in an amount of 15 wt% calculated as alumina (Al$_2$O$_3$), followed by satisfactory kneading. After the kneading, the mixture is shaped into particles having a size of 10–24 mesh (JIS sieve), and then dried at 110° C. overnight and calcined at 500° C. for 2 hours in air. The resulting catalyst is used to effect the dewaxing reaction of a desulfurized vacuum gas oil. Ten days after the start of the reaction, the reaction temperature reaches 334° C. and the pour point of the 165° C.+ fraction of the product is found to be −15° C. An increasing rate of the reaction temperature necessary for maintaining the pour point is 5.8° C./day. The yield of the 165° C.+ fraction is 85.3 wt% and the bromine number of this fraction is 1.8.

The catalyst is evaluated using gas oil, with the result that 10 days after the start of the reaction, the reaction temperature reaches 327° C. and the pour point of the 165° C.+ fraction of the product is −20° C. The increasing rate of the reaction temperature necessary for maintaining the pour point is 6.0° C./day. The yield of the 165° C.+ fraction is found to be 86.4%.

The desulfurized vacuum gas oil and the gas oil used in the above fraction has the following properties.

|  | Desulfurized gas oil | Gas Oil |
|---|---|---|
| Boiling point (10–90%) (°C.) | 320–490 | 277–359 |
| Pour point (°C.) | +32.5 | +12.5 |
| Total sulfur (wt %) | 0.08 | 0.58 |
| Total nitrogen (wt ppm) | 400 | 150 |

|  | Desulfurized gas oil | Gas Oil |
| --- | --- | --- |
| Carbon residue (wt %) | 0.05 | 0.01 |

EXAMPLE 2

The procedure of Example 1 is repeated using, instead of tartaric acid, the following carboxylic acids, thereby obtaining zeolites. The reaction mixtures have the following compositions (by mole).

| A | Succinic acid | o-Toluic acid | Citric acid | Salicylic acid |
| --- | --- | --- | --- | --- |
| $SiO_2/Al_2O_3$ | 30 | 30 | 30 | 30 |
| $H_2O/SiO_2$ | 20 | 20 | 20 | 20 |
| $OH^-/SiO_2$ | 0.14 | 0.17 | 0.14 | 0.17 |
| $A/Al_2O_3$ | 2.5 | 2.5 | 2.5 | 2.5 |

The resulting products are zeolites having substantially the same X-ray diffraction pattern as shown in FIG. 1. The zeolites obtained using succinic, o-toluic, citric and salicylic acids have mesitylene adsorptions of 1.8, 1.8, 2.0 and 1.9 wt%, respectively.

The thus obtained zeolites are rendered acidic in the same manner as in Example 1 and are shaped to obtain the desired catalysts. The catalysts are each used for an evaluation test using desulfurized vacuum gas oil.

The reaction temperature at which the 165° C.+ fraction of the product has a pour point of −15° C., ten days after the start of the reaction, the increasing rate of the reaction temperature necessary for maintaining the pour point, and yield of the 165° C.+ fraction are summarized as follows.

| Carboxyl group-containing compound | Succinic acid | o-Toluic acid | Citric acid | Salicylic acid |
| --- | --- | --- | --- | --- |
| Reaction temperature (°C.) | 344 | 341 | 336 | 337 |
| Increasing rate of reaction temperature (°C./day) | 5.7 | 5.8 | 6.1 | 5.3 |
| Yield of 165° C.+ fraction (%) | 83.7 | 82.5 | 84.9 | 84.0 |
| Bromine number of 165° C.+ fraction | 2.9 | 2.8 | 2.1 | 2.4 |

EXAMPLE 3

The zeolite obtained in Example 1 is rendered acidic and shaped in the same manner as in Example 1. Thereafter, aqueous solutions of chloroplatinic acid, palladium nitrate, and nickel nitrate, respectively, are impregnated in the zeolite particles in amounts of 0.2 wt% as Pt, 0.2 wt% as Pd, and 1.0 wt% as Ni. After the impregnation with each metal component, the zeolite particles are dried at 110° C. overnight and calcined at 500° C. for 2 hours in air. The resulting catalysts are used for the dewaxing reaction of desulfurized vacuum gas oil.

With regard to the respective catalyst, the reaction temperature at which the 165° C.+ fraction of the product has the pour point of −10° C., 5 days after the start of the reaction, the increasing rate of the reaction temperature necessary for maintaining the pour point, and yield of the 165° C.+ fraction are summarized as follows.

| Metal Component | Pt | Pd | Ni |
| --- | --- | --- | --- |
| Reaction temperature (°C.) | 263 | 286 | 283 |
| Increasing rate of reaction temperature (°C./day) | 1.9 | 3.8 | 2.9 |
| Yield of 165° C.+ fraction (%) | 84.4 | 86.4 | 86.9 |
| Bromine number of 165° C.+ fraction | 1.5 | 1.9 | 1.8 |

EXAMPLE 4

The general procedure of Example 1 is repeated except that an aqueous reaction mixture of the following composition (by mole) is used.

| $SiO_2/Al_2O_3$ | 25 |
| --- | --- |
| $H_2O/SiO_2$ | 20 |
| $OH^-/SiO_2$ | 0.16 |
| $A/Al_2O_3$ | 1.0 |

The resulting product is a zeolite having substantially the same x-ray diffraction pattern as shown in FIG. 1 and a mesitylene adsorption of 1.9 wt%.

The zeolite is rendered acidic and shaped to give a catalyst in the same manner as in Example 1. The catalyst is evaluated in the same manner as in Example 1 using desulfurized vacuum gas oil. Five days after the start of the reaction, the reaction temperature reaches 310° C. and the pour point of the 165° C.+ fraction of the product is −15° C. The increasing rate of the reaction temperature necessary for maintaining the pour point is 6.2° C./day. The yield of the 165° C.+ fraction is 83.8 wt% and the bromine number of this fraction is 2.7.

COMPARATIVE EXAMPLE 1

The procedure of Example 1 is repeated using an aqueous reaction mixture having the following composition (by mole), thereby obtaining a zeolite.

| $SiO_2/Al_2O_3$ | 95 |
| --- | --- |
| $H_2O/SiO_2$ | 25 |
| $OH^-SiO_2$ | 0.32 |
| $A/Al_2O_3$ | 7.0 |

The resulting product is a zeolite having substantially the same X-ray diffraction pattern as shown in FIG. 1 and a mesitylene adsorption of 0.7 wt%.

The zeolite product is rendered acidic and shaped to give a catalyst in the same manner as in Example 1. The catalyst is evaluated using desulfurized vacuum gas oil. Ten days after the start of the reaction, the reaction temperature reaches 395° C. and the pour point of the 165° C.+ fraction of the product is −15° C. The increasing rate of the reaction temperature necessary for maintaining the pour point is 7.1° C./day. The yield of the 165° C.+ fraction is 79.3% and the bromine number of this fraction is 4.3.

COMPARATIVE EXAMPLE 2

Zeolite ZSM-5 is prepared according to the process described in U.S. Pat. No. 3,702,886. The preparation conditions are indicated below.

Starting Materials (g)

| A. | Hydrous silicic acid | 68.3 |
|---|---|---|
| B. | Sodium aluminate solution | 10.5 |
| C. | Aqueous tetrapropylammonium hydroxide solution (25% aqueous solution) | 439.4 |

Compositions of reaction mixture (by mole)

| $SiO_2$ | 1.0 |
|---|---|
| $Al_2O_3$ | 0.02 |
| $Na_2O$ | 0.034 |
| $[(CH_3CH_2CH_2)_4N]_2O$ | 0.31 |
| $H_2O$ | 20 |

Figure 2:
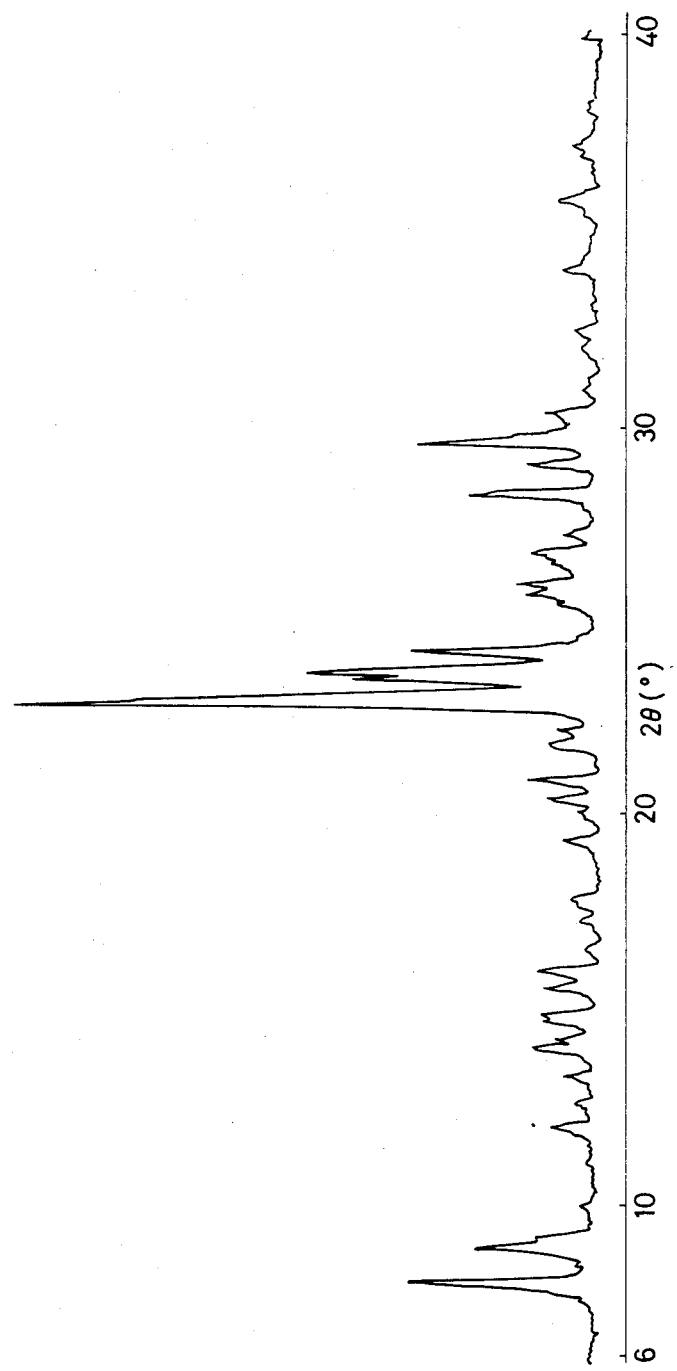
FIG. 2 is an X-ray diffraction pattern of the zeolite catalyst used in Comparative Example 2.

The starting material A is added to C to give a uniform solution. To the solution is gradually added starting material B, followed by agitation to obtain a uniform slurry reaction mixture. The reaction mixture is charged into an autoclave and heated to 160° C. with agitation, followed by crystallization for 72 hours. After completion of the crystallization, the crystals are washed with water to such an extent that they became approximately neutral. Thereafter, the washed crystals are dried at 120° C. for 15 hours. The resulting zeolite is zeolite ZSM-5 having an X-ray diffraction pattern such as shown in FIG. 2 and a mesitylene adsorption of 0.8 wt%.

The thus obtained ZSM-5 zeolite is shaped, calcined, exchanged with ammonium ions, and calcined to obtain a catalyst. This catalyst is evaluated using desulfurized vacuum gas oil. Ten days after the start of the reaction, the reaction temperature reaches 374° C. and the pour point of the 165° C.+ fraction of the product is −15° C. The increasing rate of the reaction temperature necessary for maintaining the pour point is 8.3° C./day. The yield of the 165° C.+ fraction is 77.8% and the bromine number of this fraction is 4.1.

COMPARATIVE EXAMPLE 3

Synthetic Mordenite (Zeolon 100NA, Norton Co., Ltd.) is rendered acidic and shaped to give a catalyst in the same manner as in Example 1. The catalyst is subjected to an evaluation test using desulfurized vacuum gas oil. As a result, it is found that even when the reaction temperature is increased up to 400° C., a distillate having a boiling point over 165° C. does not have a pour point below −10° C. The mordenite catalyst has a mesitylene adsorption of 2.3 wt% and thus the requirements of the present invention are satisfied. However, d spacing (dÅ) obtained from the X-ray diffraction pattern is just as shown below and is thus different from those of Table 1.

d (angstrom): 7.02, 6.55, 4.53, 4.00, 3.48, 3.39, 3.21.

EXAMPLE 5

A vacuum oil having the following properties is used as feedstock.

| Specific gravity (15/4° C.) | 0.9122 |
|---|---|
| Pour point | 25.0° C. |
| Kinematic viscosity (98.9° C.) | 5.801 cst. |
| Viscosity index | 66 |

The starting oil is fed to the bottom of an extraction tower and is subjected to a countercurrent extraction with furfural fed from the top of the extraction tower. The extraction temperatures are 90° C. at the inlet side for the furfural and 65° C. at the outlet side. The furfural is used in an amount of 1.2 parts by volume per unit part by volume of the starting oil. The discharge from the tower top is subjected to distillation to remove the furfural solvent therefrom, thereby obtaining raffinate having the following properties. The raffinate is obtained in a yield of 78.5 wt%.

| Specific gravity (15/4° C.) | 0.8902 |
|---|---|
| Pour point | 30.0° C. |
| Kinematic viscosity (@ 98.9° C.) | 5.416 cst. |
| Viscosity index | 98 |

The thus obtained raffinate is subjected to the dewaxing reaction using the catalyst obtained in Example 1.

The reaction temperature is changed according to the catalytic activity so that the pour point of the 270° C.+ product is controlled to be a predetermined temperature. Ten days after the start of the reaction, the reaction temperature reaches 335° C. and the pour point of the 270° C.+ fraction of the product is −10° C. The increasing rate of the reaction temperature necessary for maintaining the pour point is 5.5° C./day.

The yield and properties of the product are as follows.

| Yield of $C_1$-$C_4$ compounds | 4.0 wt % |
|---|---|
| Yield of $C_5$ - 270° C. fraction | 10.4 wt % |
| Yield of 270° C.+ fraction | 85.6 wt % |
| Specific gravity (15/4° C.) | 0.9072 |
| Pour point | −10.0° C. |
| Kinematic viscosity (@ 98.9° C.) | 6.132 |
| Viscosity index | 81 |

EXAMPLE 6

The zeolites obtained in Example 2 are used for the dewaxing reaction in the same manner as in Example 5. Ten days after the start of the reaction, the reaction temperatures at which the 270° C.+ fraction has a pour point of −10° C., the increasing rate of the reaction temperature necessary for maintaining the pour point, and the yield of the 270° C.+ fraction are as follows.

| Carboxyl group-containing compound | Succinic acid | o-Toluic acid | Citric acid | Salicylic acid |
|---|---|---|---|---|
| Reaction temperature (°C.) | 347 | 343 | 338 | 338 |
| Increasing rate of reaction temperature (°C./day) | 5.4 | 5.5 | 5.8 | 5.0 |
| Yield at 270° C.+ fraction (%) | 84.0 | 82.8 | 85.2 | 84.3 |
| Specific gravity (15/4° C.) | 0.9089 | 0.9079 | 0.9075 | 0.9080 |
| Pour point (°C.) | −10.0 | −10.0 | −10.0 | −10.0 |
| Kinematic viscosity 98.9° C. (cst). | 6.073 | 6.091 | 6.105 | 6.111 |

-continued

| Carboxyl group-containing compound | Succinic acid | o-Toluic acid | Citric acid | Salicylic acid |
|---|---|---|---|---|
| Viscosity index | 81 | 80 | 82 | 81 |

COMPARATIVE EXAMPLE 4

The catalyst obtained in Comparative Example 1 is used for the dewaxing reaction of the raffinate obtained by extraction with furfural in the same manner as in Example 5. Ten days after the start of the reaction, the reaction temperature reaches 396° C. and the pour point of the 270° C.+ fraction of the product is −10° C. The increasing rate of the reaction temperature necessary for maintaining the pour point is 6.9° C./day. The yield and properties of the product are as follows.

| | |
|---|---|
| Yield of $C_1$-$C_4$ compounds | 5.1 wt % |
| Yield of $C_5$ - 270° C. fraction | 15.3 wt % |
| Yield of 270° C.+ fraction | 79.6 wt % |
| Specific gravity (15/4° C.) | 0.9101 |
| Pour point | −10.0° C. |
| Kinematic viscosity (@ 98.9° C.) | 6.056 |
| Viscosity index | 80 |

COMPARATIVE EXAMPLE 5

The ZSM-5 zeolite catalyst obtained in Comparative Example 2 is used for the dewaxing reaction of the raffinate obtained by extraction with furfural in the same manner as in Example 5.

Ten days fter the start of the reaction, the reaction temperature reaches 375° C. and the pour point of the 270° C.+ fraction of the product is −10° C. The increasing rate of the reaction temperature necessary for maintaining the pour point is 8.1° C./day. The yield and properties of the product are as follows.

| | |
|---|---|
| Yield of $C_1$-$C_4$ compounds | 5.7 wt % |
| Yield of $C_5$ - 270° C. fraction | 16.2 wt % |
| Yield of 270° C.+ fraction | 78.1 wt % |
| Specific gravity (15/4° C.) | 0.9095 |
| Pour point | −10.0° C. |
| Kinematic viscosity (@ 98.9° C.) | 6.023 |
| Viscosity index | 80 |

What is claimed is:

1. A process for dewaxing a hydrocarbon fraction comprising contacting a hydrocarbon fraction with hydrogen in the presence of a catalyst comprising a zeolite having an X-ray diffraction pattern as shown in Table 1 and mesitylene adsorption of not less than 1.8 wt%.

2. The process according to claim 1, wherein the zeolite catayst is represented by the general formula $(1.0\pm0.2)M_{2/n}O.Al_2O_3.XSiO_2.YH_2O$ ps wherein M represents a cation, n is a valence of M, X is an integer of from 15 to 60, and Y is an integer of from 0 to 25.

3. The process according to claim 2, wherein the cation is hydrogen or a precursor thereof.

4. The process according to claim 2, wherein X is an integer of from 20 to 35.

5. The process according to claim 1, wherein the catalyst is shaped to have a size ranging from 0.05 to 10 mm.

6. The process according to claim 1, wherein the catalyst substantially consists of the zeolite.

7. The process according to claim 1, wherein the catalyst further comprises a binder therefor.

8. The process according to claim 1, wherein the catalyst further comprises a hydrogenation component.

9. The process according to claim 6, wherein the catalyst further comprises a hydrogenation component.

10. The process according to claim 7, wherein the catalyst further comprises a hydrogenation component.

11. The process according to claim 1, wherein the zeolite has mesitylene adsorption of not less than 2.0 wt%.

12. The process according to claim 1, wherein the zeolite is obtained by providing an aqueous reaction mixture of $SiO_2$, $Al_2O_3$, an alkaline source as $OH^-$, and a carboxyl group-containing organic compound having the following composition:

| | |
|---|---|
| $SiO_2/Al_2O_3$ | 20–60 |
| $H_2O/SiO_2$ | 5–100 |
| $OH^-/SiO_2$ | 0.1–0.35 |
| $A/Al_2O_3$ | 1.0–100 | wherein A represents the carboxyl group-containing organic compound, and reacting the mixture until crystals are produced.

13. The process according to claim 12, wherein the carboxyl group-containing organic compound is tartaric acid.

14. The process according to claim 12, wherein the carboxyl group-containing organic compound is succinic acid.

15. The process according to claim 12, wherein the carboxyl group-containing organic compound is o-toluic acid.

16. The process according to claim 12, wherein the carboxyl group-containing organic compound is citric acid.

17. The process according to claim 12, wherein the carboxyl group-containing organic compound is salicylic acid.

18. The process according to claim 1, wherein the hydrocarbon fraction is a vacuum distillate having a boiling point of from about 300° C. to 550° C. or a solvent deasphalted vacuum residue.

19. The process according to claim 1, wherein the contact is effected at a reaction temperature of from about 250° C. to 455° C., a pressure of from about 10 to 70 kg/cm²G, and a liquid hour space velocity ranging from about 0.5 to 4.0 hr⁻¹.

20. The process according to claim 1, wherein the ratio of the hydrogen to the hydrocarbon fraction is in the range of from 100 to 1000N-m³/m³.

21. The process according to claim 12, wherein the aqueous reaction mixture has the following composition:

| | |
|---|---|
| $SiO_2/Al_2O_3$ | 20–60 |
| $H_2O/SiO_2$ | 5–100 |
| $OH^-/SiO_2$ | 0.1–0.35 |
| $A/Al_2O_3$ | 1.0–100 | wherein A represents the carboxyl group-containing organic compound.

* * * * *